(12) United States Patent
Steiner

(10) Patent No.: US 9,135,500 B2
(45) Date of Patent: Sep. 15, 2015

(54) FACIAL RECOGNITION

(75) Inventor: Matthew S. Steiner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 798 days.

(21) Appl. No.: 13/401,076

(22) Filed: Feb. 21, 2012

(65) Prior Publication Data

US 2012/0213420 A1 Aug. 23, 2012

Related U.S. Application Data

(60) Provisional application No. 61/444,425, filed on Feb. 18, 2011.

(51) Int. Cl.
*G06K 9/00* (2006.01)

(52) U.S. Cl.
CPC ........ *G06K 9/00295* (2013.01); *G06K 9/00926* (2013.01)

(58) Field of Classification Search
CPC ................... G06F 17/30265; G06F 17/30256; G06F 17/30247; G06F 17/30244; G06F 17/30259; G06F 17/3053; G06F 17/30867; G06K 9/00288; G06K 9/00228; G06K 9/00295; G06K 2009/00328; G06K 9/00221; G06K 9/00281; G06K 9/00677; G06K 9/623; H04L 67/306

See application file for complete search history.

(56) References Cited

U.S. PATENT DOCUMENTS

| | | |
|---|---|---|
| 6,606,398 B2 | 8/2003 | Cooper |
| 7,945,653 B2 | 5/2011 | Zuckerberg et al. |
| 2005/0197846 A1 | 9/2005 | Pezaris et al. |
| 2008/0040475 A1 | 2/2008 | Bosworth et al. |
| 2008/0040673 A1 | 2/2008 | Zuckerberg et al. |
| 2008/0089561 A1* | 4/2008 | Zhang ............................ 382/118 |
| 2008/0270425 A1 | 10/2008 | Cotgreave |
| 2011/0038512 A1 | 2/2011 | Petrou et al. |
| 2011/0085710 A1 | 4/2011 | Perlmutter et al. |
| 2011/0129120 A1* | 6/2011 | Chan ............................ 382/103 |
| 2011/0182485 A1 | 7/2011 | Shochat et al. |

OTHER PUBLICATIONS

Toward Large-Scale Face Recognition Using Social Network Context Stone, Z. ; Zickler, T. ; Darrell, T. Proceedings of the IEEE vol. 98, Issue: 8 DOI: 10.1109/JPROC.2010.2044551 Publication Year: 2010, pp. 1408-1415.*

(Continued)

*Primary Examiner* — Kim Vu
*Assistant Examiner* — Michael Vanchy, Jr.
(74) *Attorney, Agent, or Firm* — IP Spring

(57) ABSTRACT

Methods, systems, and apparatus, including computer programs encoded on a computer storage medium, for performing facial recognition. In one aspect, a method includes accessing a first digital photograph. A first face template is generated for each face detected in the first digital photograph. Second user identifiers that are associated with a first user identifier are determined. A digital photograph index of photographs, user identifiers, and areas in the digital photographs in which a face of a user identified by user identifier is located is accessed. Second user identifiers are selected, and second face templates are generated from the faces of the user the digital photographs. First face templates that match second face templates are identified, and for each first face template that matches a second face template, data is generated specifying the area in the first digital photograph in which the face of the second user is located.

19 Claims, 8 Drawing Sheets

(56) References Cited

OTHER PUBLICATIONS

Face annotation for personal photos using collaborative face recognition in online social networks Jaeyoung Choi ; De Neve, W. ; Yong Man Ro ; Plataniotis, K.N. Digital Signal Processing, 2009 16th International Conference on DOI: 10.1109/ICDSP.2009.5201095, Publication Year: 2009, pp. 1-8.*

Toward Large-Scale Face Recognition Using Social Network Context Stone, Z. ; Zickler, T. ; Darrell, T. Proceedings of the IEEE vol. 98, Issue: 8 DOI: 10.1109/JPROC.2010.2044551, Publication Year: 2010, pp. 1408-1415.*

Canadian Office Action mailed Nov. 25, 2014 in related Canadian Application No. 2,827,639.

Japanese Office Action mailed Oct. 21, 2014 in related Japanese Application No. 2013-554676.

Patent Examinaiton Report No. 1 issued Dec. 24, 2014 in related Autstralian Application No. 2012219277.

KIPO; Korean Office Action for KR Patent Application 10-2013-7024614; dated Dec. 26, 2014, English and Korean language.

Carthy, Face.com Brings Facial Recognition to Facebook Photos (We have Invites) [online] Mar. 24, 2009 [Retrieved on Mar. 15, 2012]. Retrieved from the Internet <URL: http://techcrunch.com/2009/03/24/facecom-brings-facial-recognition-to-facebook-photos-we-have-invites>.

Knies, Computers Working on Your Behalf, Microsoft Research [online] Mar. 3, 2010 [Retrieved on Mar. 15, 2012]. Retrieved from the Internet: <URL: http://research.microsoft.com/en-us/news/features/030310-behalf.aspx>.

Chellappa and Zhou, Face Tracking and Recognition from Video* in Handbook of Face Recognition (Chapter 8) (2nd Edition), Li & Jain (Eds), [online] 2011 [Retrieved on Mar. 15, 2012]. Retrieved from the Internet <URL: http://www.cs.hmc.edu/research/robotics/Handbook_of_Face_Recognition/chapter0.pdf>.

Face.com Brings Facial Recognition to Facebook Photos (We have Invites). ITI Technology Observatory—Noticias y opinión: Face.com Brings Facial Recognition T . . . [online] Mar. 15, 2012 [Retrieved on Mar. 15, 2012]. Retrieved from the Internet <URL: https://observatorio.iti.upv.es/resources/new/3686>.

Wiskott et al., Face Recognition by Elastic Bunch Graphic Matching*† In Intelligent Biometric Techniques in Fingerprint and Face Recognition, eds. Jain et al. CRC Press, Chapter 11, pp. 355-396, 1999.

Face.com Developers, Documentation :: User IDs & Namespaces [online] copyright 2010 [Retrieved on Mar. 15, 2012]. Retrieved from the Internet: <http://developers.face.com/docs/users/>.

Office Action, dated Jul. 9, 2014, for related European Patent Application No. 12707445.8.

Stone et al., "Toward Large-Scale Face Recognition Using Social Network Context," Proceedings of the IEEE, NY, US., vol. 98, No. 8, 1, pp. 1408-1415, Aug. 2010.

Choi et al., "Collaborative Face Recognition for Improved Face Annotation in Personal Photo Collections Shared on Online Social Networks," IEEE Transactions on Multimedia, Piscataway, NJ, US., vol. 13, No. 1, 1, pp. 14-28, Feb. 2011.

JPO; Japan Office Action for JP Patent Application 2013-554676; dated Oct. 21, 2014, English and Japanese language.

Gross et al., "Information Revelation and Privacy in Online Social Networks", Proceedings of the 2005 ACM Workshop on Privacy in the Electronic Society, WPES, 2005.

Yongjin et al., "One-Time Templates for Face Authentication", Convergence on Information Technology, IEEE, 2007.

Rathgeb et al., "A Survey on Biometric Cryptosystems and Cancelable Biometrics", Eurasip Journal on Information Security, 2011.

Cammozzo, "Face Recognition and Privacy Enhancing techniques", Ethicomp, 2011.

Tan et al., "Face Recognition from a Single Image per Person: A Survey", Pattern Recognition, Elsevier, 2006.

International Search Report, dated Mar. 7, 2013, for related PCT Application No. PCT/US12/025934.

Written Opinion, dated Aug. 18, 2013, for related PCT Application No. PCT/US12/025934.

* cited by examiner

FACIAL RECOGNITION

CLAIM OF PRIORITY

This application claims priority under 35 USC §119(e) to U.S. patent application Ser. No. 61/444,425, filed on Feb. 18, 2011, the entire contents of which are hereby incorporated by reference.

BACKGROUND

This specification relates to processes for performing facial recognition without requiring long term storage of biometric information. Systems exist today in which digital images can be processed to identify the presence and locations of human faces. Some of these systems determine feature values (e.g., the relative location and spacing of eyes, nose, jaw) to determine that a human face is present in the image.

Systems also exist today for the recognition of identified faces to automatically identify a name for the face. Many of these systems are based on formulating a biometric model of a known person's face, and storing that biometric model in the form of a facial recognition template. When an unknown face is later detected in a digital image, the unknown face is analyzed to extract feature information and that information is compared against a collection of stored biometric models of known faces to determine a close match. The unknown face is then associated with the identifier associated with the matching biometric model.

Often, however, it is impractical to maintain a database of such templates. The impracticalities may be due to both system resource constraints and other non-system resource constraints. For example, memory storage (e.g., system resource constraints) and privacy concerns, legal requirements, agreements between parties (non-system resource constraints) may limit the ability to maintain a database of templates. One solution is to generate facial recognition templates "on the fly", i.e., at the time a facial recognition process is required. However, a system may maintain millions of photos, and the generation of templates may be time consuming as many resources are required to process the photographs.

SUMMARY

This specification describes technologies relating to methods and techniques for performing automated facial recognition substantially without the use of stored biometric information.

In general, one innovative aspect of the subject matter described in this specification can be embodied in methods that include the actions of accessing, at a data processing apparatus, a first digital photograph; generating a first face template for each face detected in the first digital photograph; determining second user identifiers that are associated with a first user identifier, the first user identifier and second user identifiers identifying users; accessing a digital photograph index that indexes photographs by user identifiers, and that specifies, for each digital photograph and for each user identifier indexing the digital photograph, an area in the digital photograph in which a face of a user identified by user identifier is located; selecting second user identifiers, and for each of the selected second user identifiers, generating a second face template for the second user identifier from each of the faces of the user in the predefined areas of the digital photographs indexed by the second user identifier; identifying first face templates that match second face templates; and for each first face template that matches a second face template, generating data specifying the area in the first digital photograph in which is located the face of the second user identified by the second user identifier of the second face template. Other embodiments of this aspect include corresponding systems, apparatus, and computer programs, configured to perform the actions of the methods, encoded on computer storage devices.

Various embodiments can include some, all, or none of the following features. Each face template can be stored in non-persistent memory and may not be persisted after identifying first face templates that match second face templates. Determining second user identifiers that are associated with the first user identifier can include generating, for each of a plurality of second user identifiers, an affinity score representing a relationship of the first user identified by the first user identifier to the second user identified by the second user identifier; and determining second user identifier having an affinity score that meet a threshold are associated with the first user identifier. The actions can further include ordering the second user identifiers according to the affinity scores, and selecting the second user identifiers, generating the second face templates for the second user identifiers, and identifying first face templates that match the second face templates according the order. Generating an affinity score for each of a plurality of second user identifiers can include, for each digital photograph indexed by the first user identifier, determining second user identifiers indexing the digital photograph, and, for each second user identifier, determining the affinity score, in part, on a value that is proportional to a number of digital photographs that are indexed by both the first user identifier and the second user identifier. The affinity score can be further based, in part, on a time that each of the digital photographs was generated. Generating an affinity score for each of a plurality of second user identifiers can include determining the affinity score based, in part, on a value that is proportional to a number of digital photographs of the second user that the first user has tagged with the identifier of the second user. The affinity score can be further based, in part, on a time that that the first user tagged each of the digital photographs. Determining second user identifiers that are associated with the first user identifier can include selecting second user identifiers that are associated with the first user identifier by contact list for the first user identifier. The actions can further include selecting third user identifiers, each third user identifier being a user identifier indexing a digital photograph in the digital photograph index that is also indexed by one or more of the first user identifier and second user identifiers, for each of the selected third user identifiers, generating a third face template for the third user identifier from the faces of the user in the predefined areas of the digital photographs indexed by the third user identifier, identifying first face templates that match third face templates, and, for each first face template that matches a third face template, generating data specifying the area in the first digital photograph in which is located the face of the third user identified by the third user identifier of the third face template. The actions can, further include, for each first face template that matches a second face template for a second user identifier, generating a quality score for the first face template, determining whether the quality score exceeds a quality score threshold, and if the quality score exceeds the quality score threshold, storing in the digital photograph index data indexing the first photograph by second user identifier, and that specifies that area in the digital photograph in which the face of the second user identified by second user identifier is located.

Another innovative aspect of the subject matter described in this specification can be embodied in methods that include the actions of accessing, at a data processing apparatus, a first digital photograph; generating a face template for each face detected in the first digital photograph; for each face template: determining a user identifier, each user identifier identifying a user whose detected face in the first digital photograph was used to generate the face template, generating a quality score for the face template, determining whether the quality score exceeds a quality score threshold, and if the quality score exceeds the quality score threshold, storing in a digital photograph index data indexing the first photograph by user identifier determined for the face template, the quality score, and data that specifies that area in the first digital photograph in which the face of the user identified by first user identifier is located. Other embodiments of this aspect include corresponding systems, apparatus, and computer programs, configured to perform the actions of the methods, encoded on computer storage devices.

Various embodiments can include some, all, or none of the following features. Determining whether the quality score exceeds a quality score threshold comprises: accessing the digital photograph index by the user identifier; retrieving from the digital photograph index quality scores of other face templates of the user identified by the user identifier, each of the other face templates generated from an area in a different digital photograph in which the face of the user identified by user identifier is located; and determining that the quality score exceeds a quality score threshold when the quality score of the face template for the first digital photograph exceeds at least one of the quality scores retrieved from the digital photograph index of other face templates of the user identified by the user identifier. In response to determining of the face template for the first digital photograph exceeds at least one of the quality scores retrieved from the digital photograph index of other face templates of the user identified by the user identifier, removing from the digital photograph index data indexing the different digital photograph in which the face of the user identified by user identifier is located and from which the face template for which the one of the quality scores corresponds was generated.

Particular embodiments of the subject matter described in this specification can be implemented so as to realize one or more of the following advantages. By selectively generating facial templates for a selected set of user identifiers, processing resources and the time required to carry out a facial recognition process are reduced relative to generating facial templates for a much larger set of photographs. The required time can be such that the delay, as perceived by a user, does not result in a degradation of the user experience. Additionally, the facial templates need not be persisted to long term storage, and can be removed from memory after performing the facial recognition process, thereby ensuring compliance with one or more non-system resource constraints.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems and techniques for performing facial recognition without the use of stored biometric data, particularly within the context of a social network according to embodiments of the present disclosure. As described below, face images in digital photos that are submitted to a computer system are tagged manually, semi-automatically, or automatically to associate the face images with the identifiers of the persons to whom they belong. For persons who choose to participate in such a system and give permission for their faces to be recognized automatically, collections of digital photos having identified faces are associated with the online identifiers of various persons pictured in the photos. When needed, the collection of photos or the face images within them, associated with a particular person, are analyzed to create a temporary facial recognition model for the person. The model is then compared against features extracted from unknown face images to identify a possible match, and then the model is deleted.

Unlike some facial recognition systems in which templates or other biometric data associated with an identified person is preserved for future recognition operations. The long term storage of biometric data may raise privacy concerns among various people, and in some jurisdictions such long term storage of biometric data may be subject to legal requirements. The systems and techniques described below address these concerns by eliminating the long term storage of biometric data for automatic facial recognition.

Figure 1:
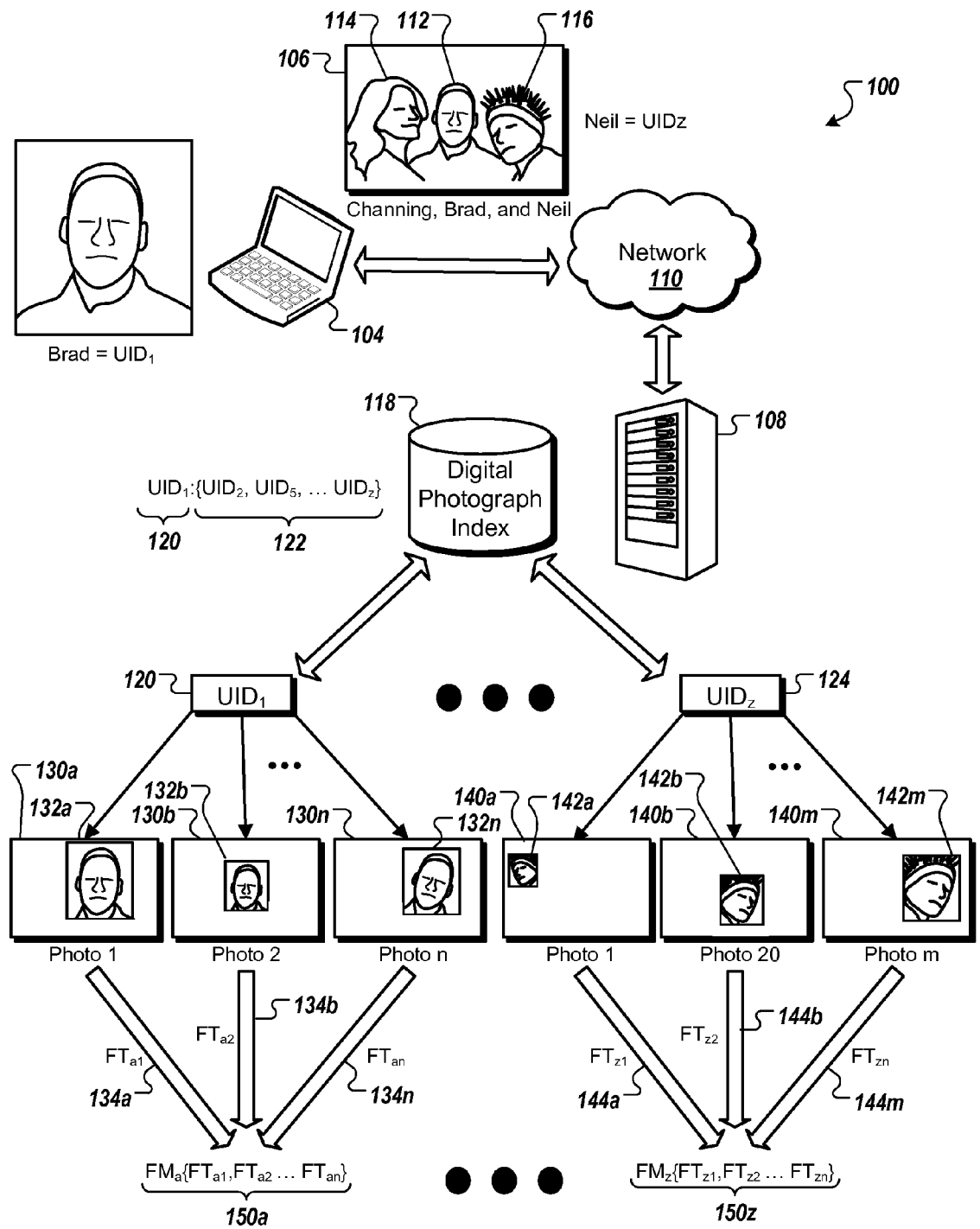
FIG. 1 is a block diagram of a system for performing facial recognition in digital images according to embodiments of the present disclosure.

FIG. 1 is a block diagram of a system 100 for performing facial recognition in digital images according to embodiments of the present disclosure. In general, a user can submit a digital photograph to the system 100, and the system 100 will attempt to identify the faces of persons in the photograph that belong to other people in groups of other users associated with the user (e.g., lists of enumerated identifiers, contact groups, friend list, or based on other relationships that can be used to define sets of user identifiers).

The groups are, for example, based on categories of relationships of a user to other users. In some examples, the relationship can be implicit or explicit. For example, a user can assign their social networking contacts and better control the distribution and visibility of social networking posts.

For illustrative purposes, the example implementations are described in the context of groups. A group is defined by a data set defining a collection of contacts that are associated with one another in a computer-implemented social networking service. A group can be described from the perspective of an individual that is the center of a particular collection of socially interconnected people, or from the aggregate perspective of a collection of socially interconnected people. In some examples, a group can have narrowly defined boundaries. For example, some groups may have members that are familiar with one another, and permission may be required for a member to join a group. In some implementations, a user of the social networking service define a group, and the group, as a data set defining a collection of contacts, may reflect a real-life social group of the user. These are examples of groups as used in the specification. However, groups need not be limited to these examples.

Examples of groups identified by implicit relationships are users that are implicitly identified so as to form a group that is distinct from the larger group of all users. Such implicit relationships can be based on frequent contact between the user and other users, the co-occurrence of the user and other users in photographs, users that the user photographs, and users that have photographed, to name just a few.

For example, the system 100 can examine the user's contact list, communications (e.g., people with whom the user emails often), second and higher degree contacts (e.g., friends of friends), social networking groups and affiliations (e.g., followed fan pages, alumni group memberships), or other groups of users defined by particular social groups, to identify other users with whom the user has social relationships. Previously identified images of these other users are then used to build temporary facial recognition models in non-persistent memory. The temporary facial recognition models are then compared against temporary facial recognition templates generated for the faces located in the submitted photograph. If matches are found, then the matched identifiers are associated with the faces identified in the submitted photograph. In some implementations, the temporary facial recognition templates are not persisted; the temporary face templates are released from memory after the facial recognition operations are performed.

In the example of the system 100, a user "Brad" interacts with a user device 104 (e.g., a personal computer, a cellular telephone, a pad computer, a tablet computer, a personal digital assistant, a camera configured to upload photos) to upload a digital photograph 106 to a server device 108 through a network 110 (e.g., a wireless or wired public network, such as the Internet). The digital photograph 106 includes a facial image 112 of user Brad, a facial image 114 of user Channing, and a facial image 116 of user Neil.

In some implementations, the server system 108 can be a single server or collection of server computers performing the functions of a web server, a communications service, a social networking service, a digital photo hosting service, or other appropriate computer service that can accept the submission of digital photographs. The server system 108 stores the digital photograph 106 in a digital photograph index 118. The digital photograph index 118 is an electronic file repository or database that can be used to store digital photographs and user identifiers for photographs submitted by users.

The user Brad is associated with a user identifier 120, labeled in the illustration as "$UID_1$". The server device 108 thus associates the digital photograph 106 with the user Brad's identifier "$UID_1$" 120. In some implementations, the digital photograph 106 may be associated with the identifier of the user who submitted the digital photograph 106. In some implementations, the digital photograph may be associated with the identifier of the user who took the photograph (e.g., a user ID embedded as metadata in the photograph), or with the identifier of a user associated with the device that was used to take the photograph (e.g., the media access control (MAC) ID of a network camera known to be managed by a particular user).

The user Brad's identifier "$UID_1$" 120 is associated with a collection of other user identifiers 122. The collection of other user identifiers 122 includes the identifiers of other users in the user Brad's social groups. In some implementations, the collection of other user identifiers 122 can include explicitly determined contacts. For example, the user Brad may declare to the server 108 that the user Channing is his wife (e.g., as part of configuring an online profile), or by "friending" the user Neil through a social networking service. In another example, the user Brad may explicitly add contacts to a collection of email contacts.

In some implementations, the collection of other identifiers 122 can include implicitly determined contacts. For example, the collection 122 may automatically include the identifiers of people who the user Brad emails or corresponds with often, people with whom the user Brad is often photographed, people who are members of a common social networking group or club, fans or followers of a common person or subject, or other appropriate associations that can be used to implicitly associate two users with each other. In some implementations, two or more users may be implicitly associated with each other based on independently declared, common traits. For example, a social networking site may request that users identify their high school and graduation year, and this information may be used to implicitly associate the user Brad's identifier "$UID_1$" 120 with the identifiers of his classmates.

The server system 108 analyzes the digital photograph 106 to detect the presence of images of human faces. For example, the server system 108 may scan the digital photograph 106 for patterns of features that generally appear in the appearance of human faces (e.g., an oval head with two eyes, spaced apart, forming a line roughly perpendicular to the bridge of a nose). If the presence of one or more human faces is detected within the digital photograph 106, the server system 108 then builds temporary facial templates based on Brad's identifier "$UID_1$" 120, the collection of other user identifiers 122, other digital photographs Brad has previously submitted to the digital photograph index 118, and other digital photographs uploaded to the digital photograph index 118 by the other users identified in the collection of other user identifiers 122.

In the illustrated example, the user Brad's identifier "$UID_1$" is used to identify a collection of digital photographs 130a-130n that include a collection of face regions 132a-132n that are known to include images of the user Brad's face. In general, face regions are sub-regions of digital photographs, and are substantially occupied by images of individual human faces, i.e., each face region is an area in the digital photograph in which a face of a user identified by user identifier is located.

Digital photographs stored in the digital photograph index 118 may be associated with user identifiers through several different processes. In some implementations, the association may be done manually. For example, a user may use tools provided by the server system 108 to review a digital photograph, identify one or more face regions within the photograph, and identify the users who appear in the face regions. In some implementations, the association may be performed semi-automatically. For example, the server system 108 may detect the presence of human faces in identified face regions within a digital photograph, and request a user to associate the face regions with their respective user identifiers. In another example, the server system 108 may go a step further and determine suggested user identifiers for faces detected within the photograph, and request a user to confirm or reject the suggestions. In some implementations, the association may be performed automatically. For example, the server system 108 determine that the correlation between an unidentified face and the appearance of a known user exceeds a predetermined threshold, and associate the known users identity with the unidentified face, substantially without user intervention.

An identifier "$UID_z$," 124, which identifies the user Neil and is included in the collection of other user identifiers 122, is used to identify a collection of digital photographs 140a-140m. The digital photographs 140a-140m include a collection of face regions 142a-142m of the user Neil's face. Data describing the respective face regions for a particular user identifier are stored in the index 118 as well so as to specify the location of the face region and preclude the necessity of an initial facial recognition scan each time a particular photograph is processed.

In some implementations, some digital photographs may appear in more than one collection. In the illustrated example, the digital photographs 130a and 140a are the same photograph, wherein the users Brad and Neil both appear in different face regions of "Photo 1". "Photo 1" appears as digital photograph 130a in the collection 130a-130n associated with the user Brad, and as digital photograph 140a in the photo collection 140a-140m associated with the user Neil.

The collections of face regions 132a-132n, 142a-142m are processed to create temporary facial recognition templates for the users imaged therein. The face regions 132a-132n are analyzed to determine a collection of temporary face templates 134a-134n (e.g., landmarks or other machine-identifiable properties of the structures visible in the face images). For example, the temporary facial recognition templates can be created by processing the collections of face regions 132a-132n, 142a-142m to measure the distance between all of the features of the face (e.g., eyes, ears, nose, corners of mouth, cheek bones) and can produce comparative ratios for those distances. The collection of temporary face templates 134a-134n is then mathematically combined to form a temporary face model 150a that is associated with the user Brad's identifier "$UID_1$" 120. Likewise, the face regions 142a-142m are analyzed to determine a collection of temporary face templates 144a-144m. The collection of temporary face templates 144a-144m is then mathematically combined to form a temporary face model 150z that is associated with the user Neil's identifier "$UID_z$" 124. For example, in some implementations, each temporary face model 150 is a set of face templates. For example, the temporary face model 150a is the set of face templates 134a, 134b, ... 134n, as indicated by the set notation $\{FT_{a1}, FT_{a2}, ... FT_{an}\}$. In other implementations, the temporary face model 150a can be a single face template that is based on the measurements of each of the constituent face templates in the set. The single face template can, for example, be based on central tendency values based on corresponding values in the set of face templates.

The temporary face models 150a-150z are then used in attempts to identify the facial images 112-116 pictured in the digital photograph 106. The processes for using these temporary face models 150a-150z will be described in the descriptions of FIGS. 2-7. When the recognition process is substantially complete, the temporary face templates 134a-134n, 144a-144m, and the temporary face models 150a-150z are destroyed and not stored. Alternatively, the templates and models are not destroyed, but are cached in memory without committing them to permanent archival storage. As long as the cache resources are available, the templates and models will be maintained in memory.

In some implementations, the server system 108 may build and/or use the temporary face models 150a-150z in a determined order. For example, the server system 108 may start by building using the temporary face model 150a first, since the user who submitted the photo (e.g. the user Brad, $UID_1$) may be highly likely to be pictured in the photo. Similarly, the server system 108 may build temporary face templates and search for the faces they represent in an order that reflects the submitting user to other users. For example, the processing and search order may include looking for the submitting user himself/herself, other users who are often photographed by the submitting user, other users with whom the submitting user is often pictured, other users who often photograph the submitting user, contacts on the submitting user's contact list, other people with whom the submitting user corresponds often, friends of the submitting user's contacts, and other appropriate users.

In some implementations, by attempting to identify faces in a determined order, unnecessary processing may be avoided. For example, by processing and identifying faces in a determined order (e.g., the most important or likely faces are searched first), a face may be identified early in the process and avoid the need for building additional temporary face templates.

Figure 2:
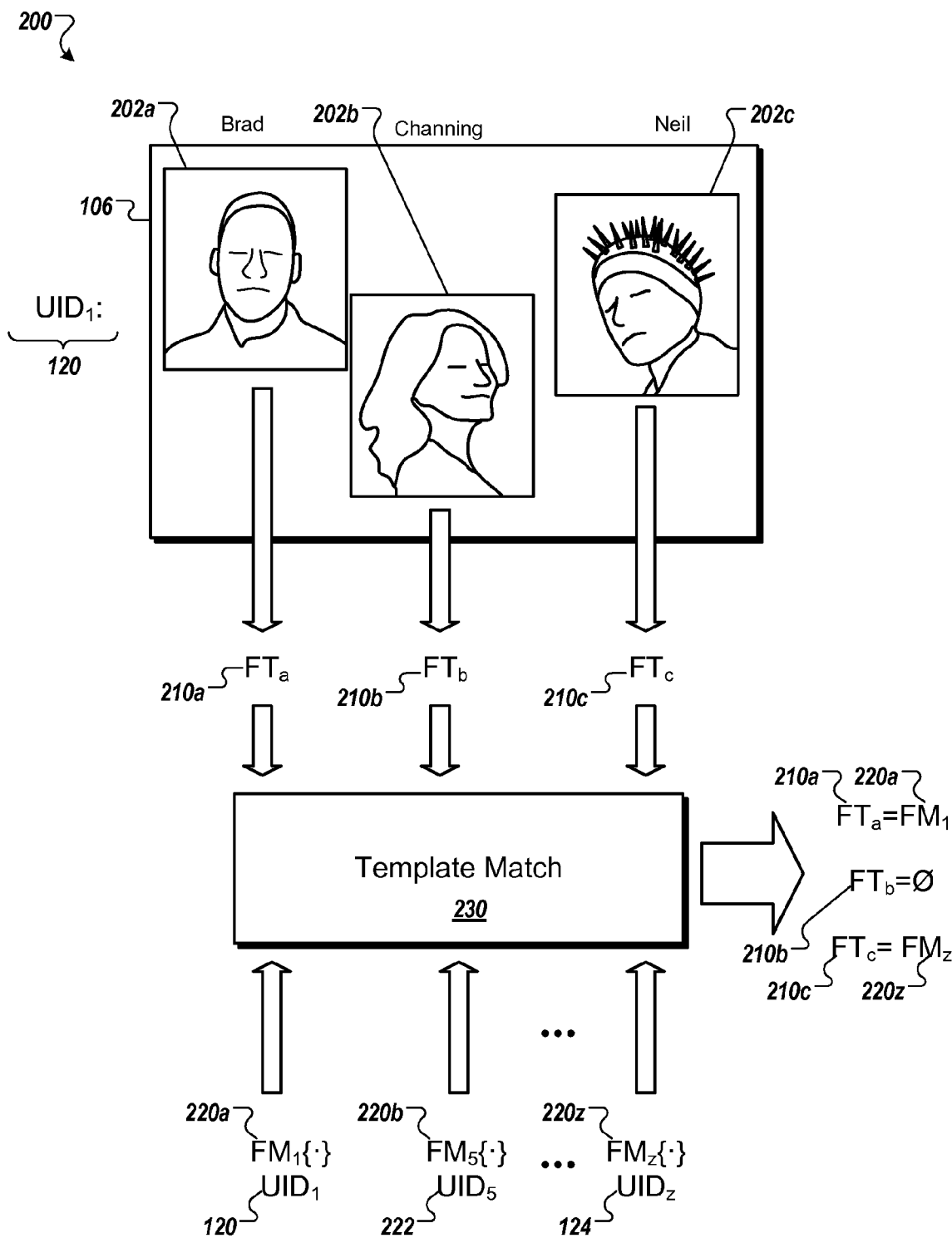
FIG. 2 illustrates a conceptual model for using face images in a facial recognition process according to embodiments of the present disclosure.

FIG. 2 illustrates a conceptual model 200 for using face images in a facial recognition process according to embodiments of the present disclosure. In the model 200, the digital photograph 106 is processed to determine the presence of human faces and identify face regions that include the determined human faces. In the illustrated example, a face region 202a, a face region 202b, and a face region 202c have been identified in the digital photograph 106.

The face regions 202a-202c are analyzed to form a temporary face template 210a based on the face included in the face region 202a, a temporary face template 210b based on the face included in the face region 202b, and a temporary face template 210c based on the face included in the face region 202c.

A temporary face model 220a is formed from images that have been previously associated with the user Brad's identifier 120, and a temporary face model 220c is formed from images that have been previously associated with the user Neil's identifier "$UID_z$" 124. Additional temporary face models, such as the temporary face model 220b, are formed from the previously identified images of other users, such as the user associated with the identifier "$UID_5$" 222, who have a social relationship to the submitting user (e.g., users identified by the collection of other user identifiers 122 of FIG. 1).

A template matching process 230 compares the temporary face templates 210a-210c to the temporary face models 220a-220z to associate the unknown persons pictured in the digital photograph 106 with the identifiers of known persons who have previously been identified. For example, the face template $FT_a$ may be compared to each face template in each face model FM, and if there is a match of the face template $FT_a$ to one of the templates in the set of templates of the face model FM, then the face template $FT_a$ is determined to match the face model FM.

In the illustrated example, the temporary face template 210a has been found to have a correspondence with the temporary face model 220a ($FT_a=FM_1$), and the temporary face template 210c has been found to have a correspondence with the temporary face model 220z ($FT_c=FM_z$). However, for the temporary face template 210b, no match was found ($FT_b$=null) (e.g., the user Channing and the user Brad may not be friends on the social network, the user Channing may not have an identifier on the social network, there may be no digital photographs in which the user Channing was previously identified, etc.). After template matches and corresponding persons in the digital photograph 106 have been identified, the temporary face templates and models are destroyed, or, alternatively, marinated in cache memory.

Figure 3:
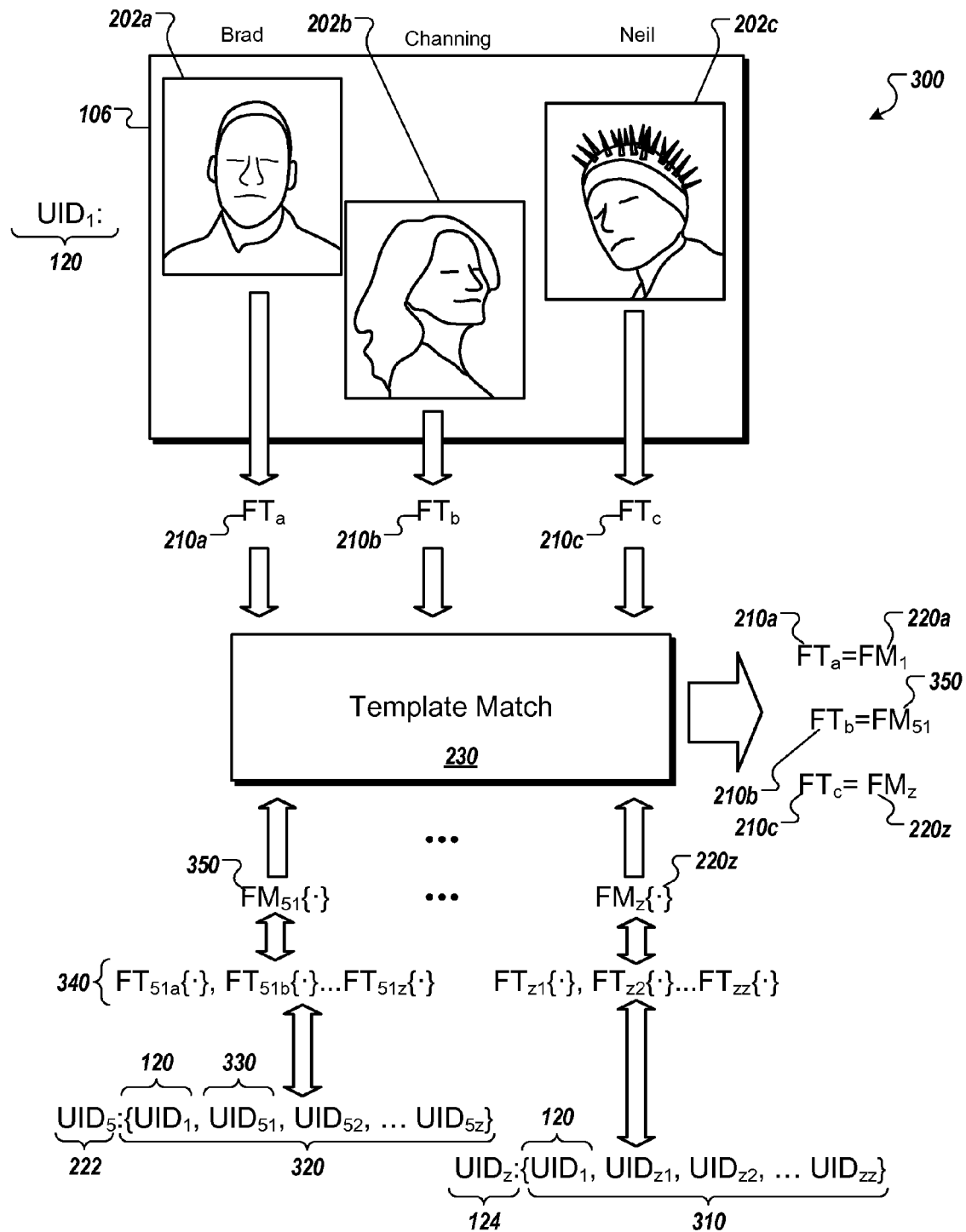
FIG. 3 illustrates another conceptual model for using face images in a digital photo in a facial recognition process according to embodiments of the present disclosure.

FIG. 3 illustrates another conceptual model 300 for using the face images 112-116 found in the digital photograph 106 in a facial recognition process according to embodiments of the present disclosure. In general, the conceptual model 300 is an extension of the processes represented by the conceptual model 200 of FIG. 2. Wherein the conceptual model 200 illustrates that temporary face models are built up from images of the submitting user's social network, the conceptual model 300 illustrates that temporary face models can be built up based on second or higher order contacts, in addition to the face templates of FIG. 2. In some implementations, higher order contacts may include, friends of friends, users appearing in the same photographs as other users, users appearing separately photographs that were taken at substantially the same location, users appearing separately in photographs taken substantially around the same time, or other users who can be indirectly connected to each other through common persons, places, and times.

In the example of the conceptual model 200, no match was found for the temporary face template 210b. Referring once again to FIG. 3 and the conceptual model 300, a match is sought for the temporary face template 210b.

The template matching process 230 identifies higher order user identifiers. The user Neil's identifier "$UID_z$" 124 is associated with a collection of other user identifiers 310. In some implementations, the collection of other user identifiers 310 can include the user Neil's social networking friends, email contacts, people with whom the user Neil frequently corresponds, people that the user Neil frequently takes pictures of, people who take pictures of the user Neil, people who frequently appear in photos with the user Neil, people who appear in photos take at substantially the same place and/or location as others in which the user Neil appears, or other appropriate user identifiers. Likewise the user identifier "$UID_5$" 222 is associated with a collection of other user identifiers 320. The collections of other user identifiers 310 and 320 both include the user Brad's identifier "$UID_1$", since the user Neil and the user associated with the user identifier "$UID_5$" 222 are mutually connected to the user Brad through the social network.

For each of the selected ones of the user identifiers included in the collections of other user identifiers 310, 320, temporary face templates are built up from images of those users' faces that have been previously identified in digital photographs. As an example, a user identifier "$UID_{51}$" 330 is associated with the user identifier "$UID_5$" (e.g., the users represented by $UID_5$ and $UID_{51}$ are connected through the social network). A collection of temporary face templates 340 is then obtained from a collection of existing photographs (not shown) in which the user represented by $UID_{51}$ has been previously identified. The collection of temporary face templates 340 is mathematically combined to form a temporary face model 350. The template matching process 230 then determines that the temporary face model 350 has a correlation to the temporary face template 210b ($FM_{51}=FT_b$). After template matches and corresponding persons in the digital photograph 106 have been identified, the temporary face templates and models are destroyed, or, alternatively, stored in cache memory.

Thus, whereas the process of FIG. 2 processes two levels of user identifiers and associated photographic data (e.g., the user identifier $UID_1$ being the first user identifier and the user identifiers $UID_2$, $UID_5$ ... $UID_z$ being second user identifiers, the process of FIG. 3 processes multiple levels of user identifiers. For example, the third user identifiers $UID_1$, $UID_{51}$, $UID_{52}$ ... $UID_{5z}$ are selected for the second level user identifier $UID_5$. Each third user identifier is user identifier indexing a digital photograph in the digital photograph index that is also indexed by one or more of the second user identifiers. The templates that are generated from the photographic data indexed each third user identifier are then compared to the templates generated from the photo 106.

Figure 4:
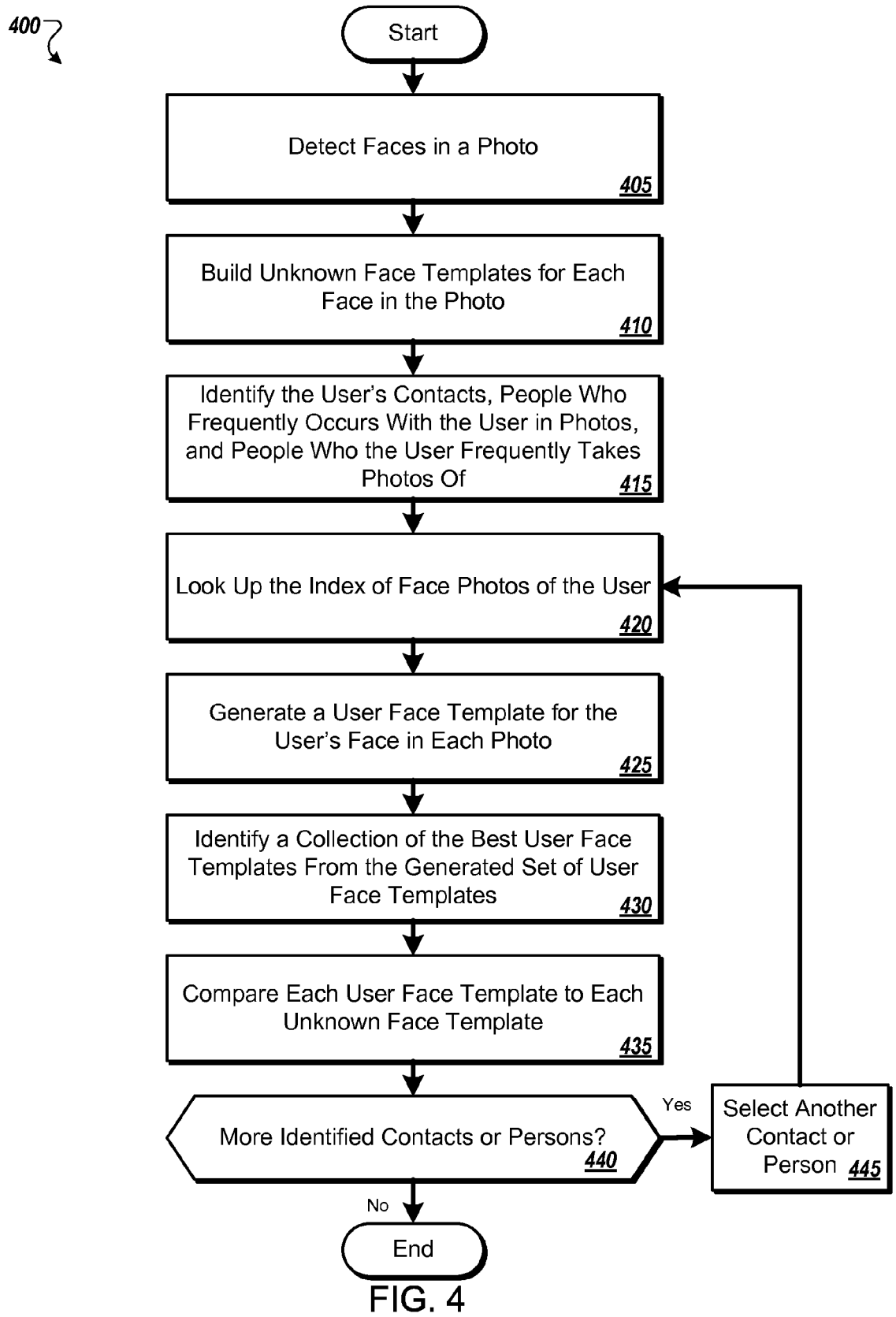
FIG. 4 is a flow diagram of an example process for performing facial recognition according to embodiments of the present disclosure.

FIG. 4 is a flow diagram of an example process 400 for performing facial recognition according to embodiments of the present disclosure. In some implementations, the process 400 may be performed by the server system 108 of FIG. 1, or may be the template matching process 230 of FIGS. 2 and 3.

The process 400 begins at step 405, when faces are detected in a digital photograph. For example, the server system 108 may analyze the digital photograph 106 to locate patterns within the digital photograph 106 that may be human faces (e.g., analyzing patterns and spacing of eyes, mouths, noses). The photograph is submitted by a user identified by a first user identifier.

At step 410, temporary face templates for each unknown face in the digital photo are built. For example, the digital photograph 106 includes the three facial images 112, 114, and 116. For each of the facial images 112-116, a temporary face template is built.

At step 415, an identification is made of the user's contacts, people who frequently occur with the user in photos, and people who the user takes photos of, resulting in the identification of second user identifiers. In some implementations, identifications can be made of other users who are indirectly affiliated with the user. For example, users who are friends of a mutual contact may be identified. In another example, the user may upload a digital photograph of a social event, such as a class reunion. Other users not explicitly associated with the user may submit photos of the same social event. The server system 108 may detect that the two sets of photos 108 were taken at substantially the same time and place (e.g., though time stamps and geotagging), and determine that the two users are implicitly connected (e.g., they are old classmates).

At step 420, an index of face photographs of the user corresponding to one of the user identifiers is looked up. For example, the digital photograph 106 is submitted by the user Brad, who has the user identifier "$UID_1$" 120, and thus the process 400 begins with the user identifier of Brad. The collection of face regions 132a-132n, which includes images of the user Brad's face, is retrieved from the digital photograph index 118. At step 425, a temporary user face template is generated for the user's face in each photo. For example, for the collection of face regions 132a-132n, the corresponding temporary face templates 134a-134n are generated and stored in non-persistent memory.

At step 430, a collection of the best user face templates are identified from the generated set of temporary user face templates. For example, some of the temporary face templates 134a-134n may be built from face regions wherein the subject's face is turned, partly obscured, blurred, improperly lit, out of focus, or otherwise made less suitable for the creation of temporary face templates. The server system 108 may rank the temporary face templates 134a-134n by their suitability for use in facial recognition processes for a selected user, and maintain an index of the best temporary facial templates' respective face regions within digital photographs. As more examples of a user's face are identified in digital photographs stored in the digital photograph index 118, the newly-identified face regions may be determined to be better suited for performing facial recognition, and the photographs associated with those face regions may replace existing, less suitable photographs in the index. An example process for determining an index of digital images for use in a facial recognition process is discussed in the description of FIG. 7.

At step 435, each of the user face templates is compared to each unknown face template to identify possible matches. In some implementations, the user face templates may be mathematically combined into a combined temporary face model, against which the unknown face templates may be compared. For example, if the face model is a set of user face templates, the each of the user face templates is compared to each unknown face template to identify possible matches. Alternatively, if the face model is a single face template derived from each of the user face templates, then the single template is compared to each unknown face template.

At step 440, a determination is made as to whether more user identifiers are to be processed. If more user identifiers are to be processed (e.g., more contacts or persons have been explicitly or implicitly identified for the user, and not all of the templates generated from the uploaded photograph have been matched), then another of the user identifiers is selected at step 445, and the process continues at step 420. If, however, no more user identifiers remain to be processed, then the process 400 ends.

In some implementations, the temporary face templates and models are not persisted substantially longer than they are needed for the process 400; when the process 400 ends, the temporary face templates and models are deleted from non-persistent memory.

Figure 5:
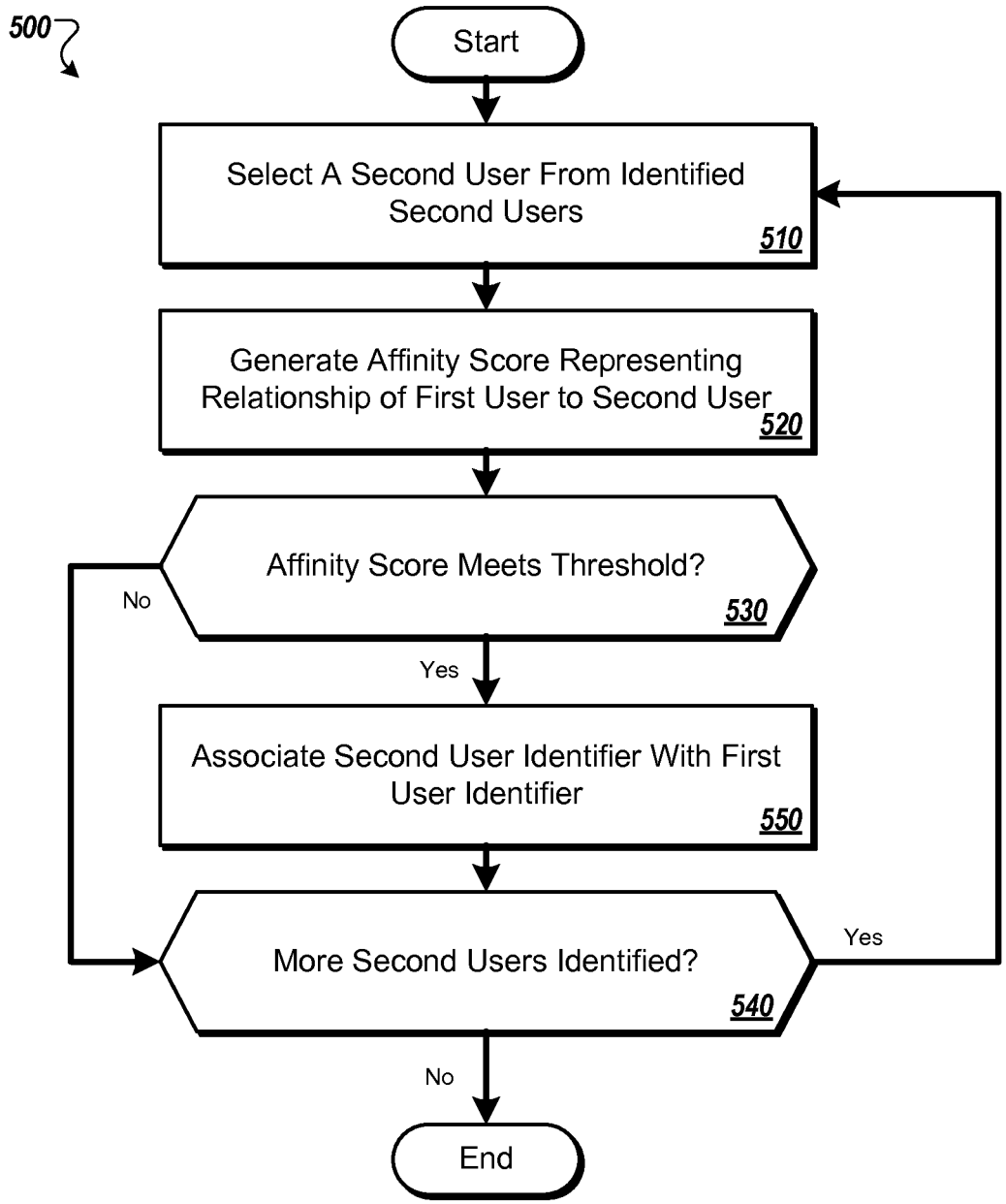
FIG. 5 is a flow diagram of an example process for selecting user identifiers of users for whom facial recognition is to be performed according to embodiments of the present disclosure.

FIG. 5 is a flow diagram of an example process 500 for selecting user identifiers of users for whom facial recognition is to be performed according to embodiments of the present disclosure. In general, the process 500 identifies other users who the submitting user may know, and filters out other users who have weak or no relationships to the submitting user, for purposes of identifying faces in a digital photograph and prioritizing the processing of their respective face templates. In some implementations, the process 500 may be performed by the server system 108 of FIG. 1, or may be the template matching process 230 of FIGS. 2 and 3. In some implementations, the process 500 may be part of step 415 of FIG. 4.

The process 500 begins at step 510, in which a second user identifier, associated with a first user identifier, is selected from a collection of identified second user identifiers. For example, a user identifier taken from a collection of all users, or a collection of users having a first, second, or other appropriate predetermined higher order of implicit or explicit connection to the first user may be selected by the server system 108.

At step 520, an affinity score representing the relationship of the first user to the second user is generated. For example, the second user may be a contact of the first user, may appear in multiple photos taken by the first user, and may correspond often with the first user, and these interactions may indicate a strong social relationship between the two users and may therefore be given a relatively high affinity score. In another example, the second user may be a friend-of-a-friend of the first user with no other known connections between the two, and these facts may indicate a weak social relationship that may be given a relatively low affinity score.

In some implementations, the affinity score may be generated by determining, for each digital photograph indexed by the submitting user's identifier, other user identifiers also indexing the digital photograph. For each of the other user identifiers, an affinity score is determined, in part, on a value that is proportional to a number of digital photographs that are indexed by both the submitting user's identifier and the other user's identifier. In some implementations, the affinity score can also be based, in part, on a time that each of the digital photographs was generated. For example, if the two users were both identified in a recent photo, the affinity score may be relatively higher than the affinity score that may be generated for a similar photo that was taken less recently.

In some implementations, the affinity score for the submitting user and another user may be based, in part, on a value that is proportional to a number of digital photographs of the other user that the submitting user has tagged with the identifier of the other user. In some implementations, these affinity scores may be further based, in part, on a time that the submitting user tagged each of the digital photographs. For example, affinity scores may be relatively higher for other users whom the submitting user has recently tagged, and the affinity scores may be relatively lower for users tagged some time ago.

At step 530, a determination is made. If the affinity score does not meet a threshold value, then the process 500 continues at step 540. For example, if the social relationship between the first user and second user is too weak, the second user identifier is not associated with the first user identifier. If, however at step 530, the affinity score meets the threshold, then at step 550 the second user identifier is associated with the first user identifier. For example, the second user identifier may be added to the collection of other user identifiers 122 associated with the user Brad's identifier "$UID_1$" 120.

At step 540 a determination is made. If there are more second user identifiers in the collection of identified second user identifiers, then the process 500 continues at step 510. If there are no more second user identifiers, then the process 500 ends.

Figure 6:
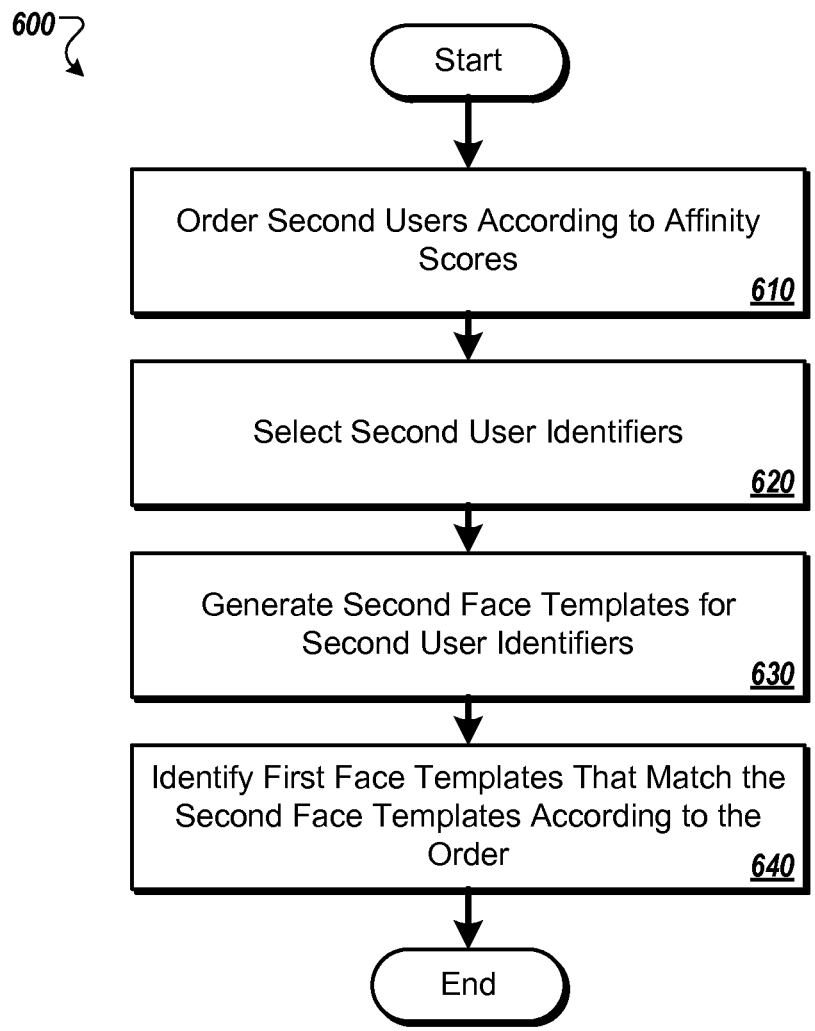
FIG. 6 is a flow diagram of an example process for recognizing selected users in a digital image according to embodiments of the present disclosure.

FIG. 6 is a flow diagram of an example process for recognizing selected users in a digital image according to embodiments of the present disclosure. In general, the process 600 ranks other users according to the apparent strengths of their social networking relationships with the submitting user, for purposes of identifying faces in a digital photograph. In some implementations, the process 600 may be performed by the server system 108 of FIG. 1, or may be the template matching process 230 of FIGS. 2 and 3. In some implementations, the process 600 may be a continuation of the process 500.

The process 600 begins at step 610, in which second user identifiers are ordered according to affinity scores. For example, the collection of other user identifiers 122 may be ranked according to the affinity scores determined at step 520 of FIG. 5.

At step 620, second user identifiers are selected, and at step 630 second face templates are generated for the second user identifiers. For example, for each of the other user identifiers 122, collections of images known to include images of the selected other user are retrieved from the server system 108 and processed to generate face templates of the selected other user.

At step 640, first face templates that match the second face templates are identified according to the order. For example, the server system 108 may first try to match unknown faces in the digital photograph 106 to the submitting user's 112 face, then try to match faces of the user's 112 contacts, then faces of other users who frequently occur with the user 112 in photos, then users who the user 112 frequently takes pictures of, and so on.

In some implementations, the search may be limited. For example, the search may end when all faces in the digital photograph have been identified. In another example, only faces in the digital photograph that are of a sufficient quality are searched upon (e.g., faces of people in the background may be skipped because they are too small or out of focus). In another example, a predetermined number of only the second users having the highest affinity scores may be compared against unknown faces in the digital photograph. In yet another example, the search may be ended after a predetermined amount of time has elapsed or a predetermined processing effort has been expended (e.g., to limit the amount of processing load consumed by photos with large numbers of faces and/or users with very large social networks to search through).

Figure 7:
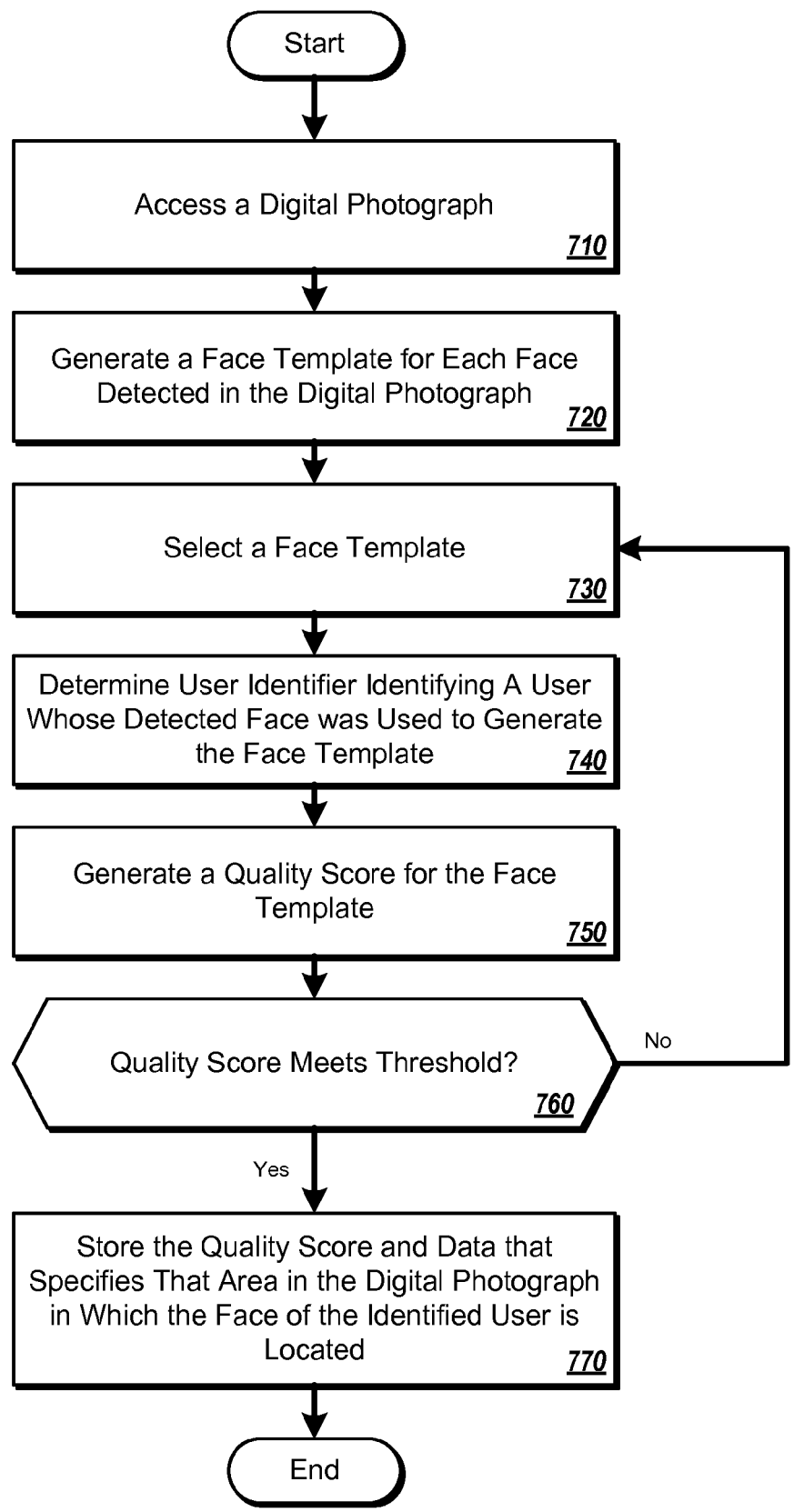
FIG. 7 is a flow diagram of an example process for updating an index of digital images for use in a facial recognition process according to embodiments of the present disclosure.

FIG. 7 is a flow diagram of an example process 700 for updating an index of digital images for use in a facial recognition process according to embodiments of the present disclosure. In general, the process of facial recognition can be enhanced by pre-identifying collections of photos that include images of a selected user's face that can be used to create high-quality temporary face templates, identifying the face areas within those photos, and storing information in association with the selected user's identifier such that the pre-identified face areas can be quickly retrieved and processed to create temporary face models. The temporary face templates and models can be used to recognize faces in a digital photo and are then deleted rather than being persisted.

In some implementations, the collections of photos may be limited to a predetermined number of photographs. For example, the collection may be limited to the best "N" (e.g., 10, 20, 50, 100) indexed photographs. As better examples of face areas are identified, previously indexed but less suitable photographs in may be replaced in the index by the newly identified ones. As such, the overall quality of the index used to generate temporary facial models may improve with use. In some implementations, the process 700 may be performed by the server system 108 of FIG. 1.

The process 700 begins at step 710 when a digital photograph is accessed. For example, the server system 108 may retrieve the digital photograph 106 from the digital photograph index 118. At step 720, a face template is generated for each face detected in the digital photograph. For example, the server system 108 can generate the temporary face templates 210a-210c from the face areas 202a-202c.

At step 730, one of the generated face templates is selected. At step 740, a user identifier identifying a user whose detected face was used to generate the selected face template is determined. For example, the server system 108 can determine that the temporary face template 210c is a match for the temporary face model 220a, and determine that the face area 202c depicts the user Neil's identifier "UIDz" 124.

At step 750 a quality score for the face template is generated. For example, the temporary face template 210c and/or the face area 202c can be analyzed and the quality of a face template can be based, in part, on the blurriness or sharpness of the photo from which the template was obtained, the light conditions in the photo (e.g., too bright or too dark can make measurements inaccurate), or how similar a template is to an existing template (e.g., don't need to keep two copies of the same template). In some implementations, diverse templates may be used for the model. For example, templates in which the user is smiling, frowning, laughing, viewed from different angles, viewed under various lighting conditions, or other appropriate views of the user can be used to improve the temporary facial model for the user.

At step 760, a determination of whether the quality score meets a threshold value is made. If the quality score does not meet a threshold value, then the process 700 continues at step 730 in which another face template is selected. If, at step 760, the quality score meets the threshold value, then the process 700 continues at step 770. At step 770, the quality score and the data that specifies that area in which the face of the identified user is located is stored. For example, the server system 108 may store the quality score, the identifier of the digital photograph 106, the user identifier, and a description of the face area 202c in the digital photograph index 118.

In some implementations, the quality score may exceed the quality score previously stored in association with a corresponding user identifier, and information corresponding to the higher quality score may be used to replace the information stored in relation to the lower quality score. For example, the lowest quality score associated with a user identifier may be used as a quality score threshold. When a higher quality score is determined for the associated user, the higher quality score and the information associated with it replace the information associated with the quality score threshold. Thus, the digital photograph index is constantly updated to index the top N quality-rated photographs for each user identifier.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 8:
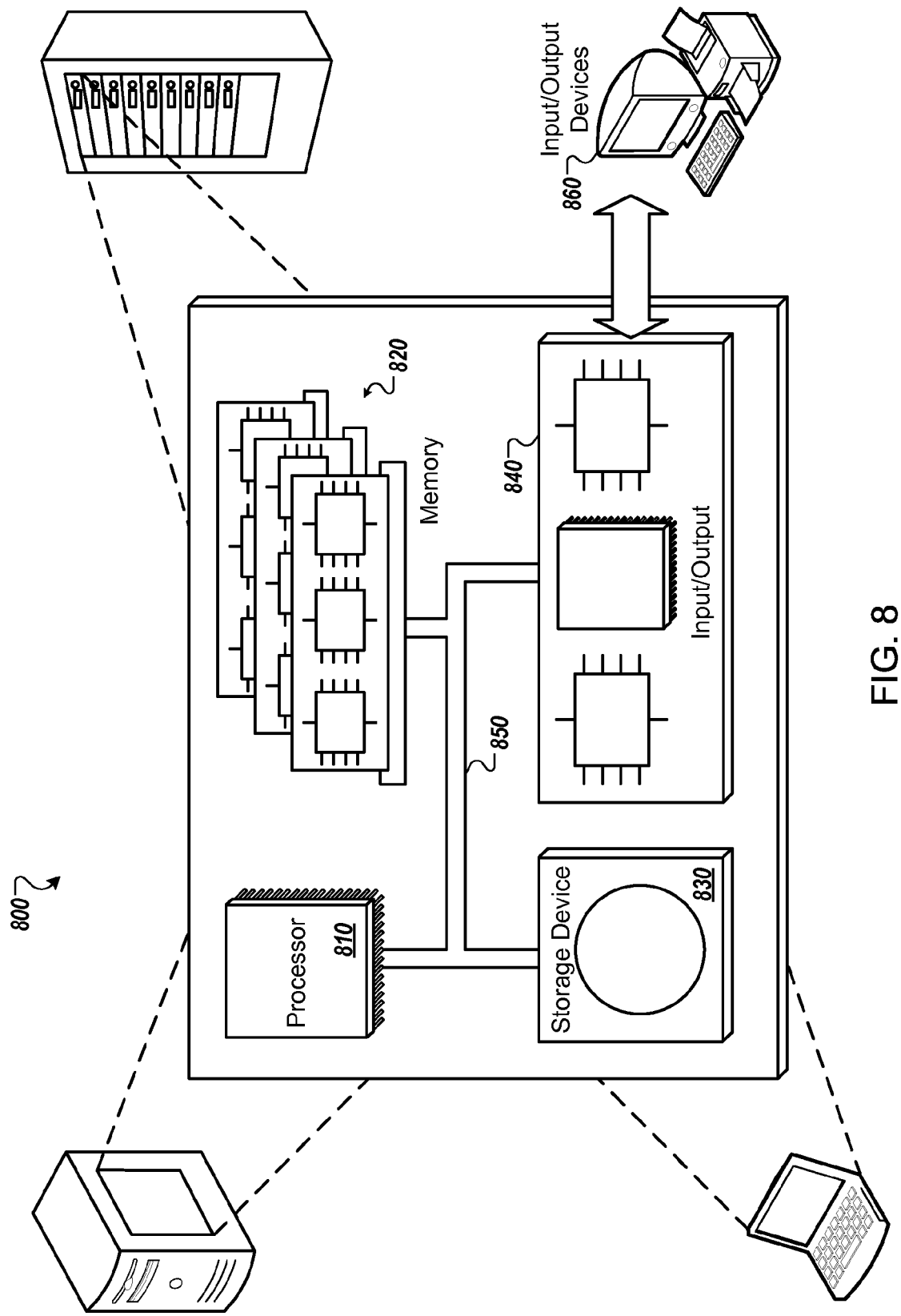
FIG. 8 is a block diagram of a programmable processing system.

An example of one such type of computer is shown in FIG. 8, which shows a block diagram of a programmable processing system 800 suitable for implementing apparatus or performing methods of various aspects of the subject matter described in this specification. The system 800 includes a processor 810, a random access memory (RAM) 820, a storage device 830, and an input/output (I/O) controller 840 coupled by a processor (CPU) bus 850. The system 800 can be preprogrammed, in ROM, for example, or it can be programmed (and reprogrammed) by loading a program from another source (for example, from a floppy disk, a CD-ROM, or another computer).

The storage device 830 suitable for storing executable computer programs, including programs embodying aspects of the subject matter described in this specification, and data including digital photographs, user identifiers, face area information, user relationships, affinity scores, quality scores, information that associates user identifiers with digital photographs, and other appropriate data.

The I/O controller 840 receives and transmits data (e.g., stills, pictures, movies, and animations for importing into a composition) in analog or digital form over communication links such as a serial link, local area network, wireless link, and parallel link.

Also coupled to the I/O controller 840 are output devices 860 which in various embodiments can include a display, a keyboard, a printer, and other input and output peripherals.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising: accessing, at a data processing apparatus,
   a first digital photograph;
      generating a first face template for each face detected in the first digital photograph by analyzing facial features of the one or more faces;
      determining second user identifiers that are associated with a first user identifier, the first user identifier and the second user identifiers identifying users;
      accessing, to retrieve areas of stored digital photographs, a digital photograph index that specifies, for each of one or more stored digital photographs indexed by one or more stored user identifiers, an area in the stored digital photograph in which a face of a user identified by the stored user identifier is located;
      selecting second user identifiers, and for each of the selected second user identifiers, generating a second face template by analyzing facial features of the faces of the user in the areas of the stored digital photographs indexed by the selected second user identifier;
      identifying first face templates that match second face templates; and
      for each first face template that matches a second face template, generating data specifying the area in the first digital photograph in which is located the face of the second user identified by the second user identifier of the second face template, wherein each of the face templates is temporarily stored in non-persistent memory and removed from the non-persistent memory after identifying the first face templates that match the second face templates.

2. The method of claim 1, wherein:
   determining second user identifiers that are associated with the first user identifier comprises:
   generating, for each of a plurality of second user identifiers, an affinity score representing a relationship of the first user identified by the first user identifier to the second user identified by the second user identifier; and
   determining second user identifier having an affinity score that meet a threshold are associated with the first user identifier.

3. The method of claim 2, further comprising:
   ordering the second user identifiers according to the affinity scores; and
   selecting the second user identifiers, generating the second face templates for the second user identifiers, and identifying first face templates that match the second face templates according the order.

4. The method of claim 2, wherein generating an affinity score for each of a plurality of second user identifiers comprises:
   for each digital photograph indexed by the first user identifier, determining second user identifiers indexing the digital photograph; and
   for each second user identifier, determining the affinity score, in part, on a value that is proportional to a number of digital photographs that are indexed by both the first user identifier and the second user identifier.

5. The method of claim 4, wherein the affinity score is further based, in part, on a time that each of the digital photographs was generated.

6. The method of claim 2, wherein generating an affinity score for each of a plurality of second user identifiers comprises determining the affinity score based, in part, on a value that is proportional to a number of digital photographs of the second user that the first user has tagged with the identifier of the second user.

7. The method of claim 6, wherein the affinity score is further based, in part, on a time that that the first user tagged each of the digital photographs.

8. The method of claim 1, wherein:
   determining second user identifiers that are associated with the first user identifier comprises:
   selecting second user identifiers that are associated with the first user identifier by contact list for the first user identifier.

9. The method of claim 1, further comprising:
   selecting third user identifiers, each third user identifier being a user identifier indexing a digital photograph in the digital photograph index that is also indexed by one or more of the first user identifier and second user identifiers;
   for each of the selected third user identifiers, generating a third face template by analyzing facial features of the faces of the user in the areas of the digital photographs indexed by the third user identifier;
   identifying first face templates that match third face templates; and
   for each first face template that matches a third face template, generating data specifying the area in the first digital photograph in which is located the face of the third user identified by the third user identifier of the third face template.

10. The method of claim 1, further comprising, for each first face template that matches a second face template for a second user identifier:
   generating a quality score for the first face template;
   determining whether the quality score exceeds a quality score threshold; and
   if the quality score exceeds the quality score threshold, storing in the digital photograph index data indexing the first photograph by second user identifier, and that specifies that area in the digital photograph in which the face of the second user identified by second user identifier is located.

11. A non-transitory computer storage medium encoded with a computer program, the program comprising instructions that when executed by data processing apparatus cause the data processing apparatus to perform operations comprising:
   accessing a first digital photograph;
   generating a first face template for each face detected in the first digital photograph by analyzing facial features of the one or more faces;

determining second user identifiers that are associated with a first user identifier, the first user identifier and the second user identifiers identifying users;

accessing, to retrieve areas of stored digital photographs, a digital photograph index that specifies, for each of one or more stored digital photographs indexed by one or more stored user identifiers, an area in the stored digital photograph in which a face of a user identified by the stored user identifier is located;

selecting second user identifiers, and for each of the selected second user identifiers, generating a second face template by analyzing facial features of the faces of the user in the areas of the stored digital photographs indexed by the selected second user identifier;

identifying first face templates that match second face templates; and for each first face template that matches a second face template, generating data specifying the area in the first digital photograph in which is located the face of the second user identified by the second user identifier of the second face template, wherein each of the face templates is temporarily stored in non-persistent memory and is removed from the non-persistent memory after identifying the first face templates that the match second face templates.

12. The non-transitory computer storage medium of claim 11, wherein:

determining second user identifiers that are associated with the first user identifier comprises:

generating, for each of a plurality of second user identifiers, an affinity score representing a relationship of the first user identified by the first user identifier to the second user identified by the second user identifier; and determining second user identifier having an affinity score that meet a threshold are associated with the first user identifier.

13. The non-transitory computer storage medium of claim 12, the operations further comprising:

ordering the second user identifiers according to the affinity scores; and selecting the second user identifiers, generating the second face templates for the second user identifiers, and identifying first face templates that match the second face templates according the order.

14. The non-transitory computer storage medium of claim 13, wherein generating an affinity score for each of a plurality of second user identifiers comprises:

for each digital photograph indexed by the first user identifier, determining second user identifiers indexing the digital photograph; and for each second user identifier, determining the affinity score, in part, on a value that is proportional to a number of digital photographs that are indexed by both the first user identifier and the second user identifier.

15. The non-transitory computer storage medium of claim 11, the operations further comprising, for each first face template that matches a second face template for a second user identifier: generating a quality score for the first face template;

determining whether the quality score exceeds a quality score threshold; and if the quality score exceeds the quality score threshold, storing in the digital photograph index data indexing the first photograph by second user identifier, and that specifies that area in the digital photograph in which the face of the second user identified by second user identifier is located.

16. A system, comprising:

a data processing apparatus; and a memory storage apparatus in data communication with the data processing apparatus and storing instructions executable by the data processing apparatus and that upon such execution cause the data processing apparatus to perform operations comprising:

accessing a first digital photograph;

generating a first face template for each face detected in the first digital photograph by analyzing facial features of the one or more faces;

determining second user identifiers that are associated with a first user identifier, the first user identifier and the second user identifiers identifying users;

accessing, to retrieve areas of stored digital photographs, a digital photograph index that specifies, for each of one or more stored digital photographs indexed by one or more stored user identifiers, an area in the stored digital photograph in which a face of a user identified by the stored user identifier is located;

selecting second user identifiers, and for each of the selected second user identifiers, generating a second face template by analyzing facial features of the faces of the user in the areas of the stored digital photographs indexed by the selected second user identifier;

identifying first face templates that match second face templates; and for each first face template that matches a second face template, generating data specifying the area in the first digital photograph in which is located the face of the second user identified by the second user identifier of the second face template, wherein each of the face templates is temporarily stored in non-persistent memory and is removed from the non-persistent memory after identifying the first face templates that match the second face templates.

17. The system of claim 16, wherein:

determining second user identifiers that are associated with the first user identifier comprises:

generating, for each of a plurality of second user identifiers, an affinity score representing a relationship of the first user identified by the first user identifier to the second user identified by the second user identifier; and determining second user identifier having an affinity score that meet a threshold are associated with the first user identifier.

18. The system of claim 16, wherein generating an affinity score for each of a plurality of second user identifiers comprises:

for each digital photograph indexed by the first user identifier, determining second user identifiers indexing the digital photograph; and for each second user identifier, determining the affinity score, in part, on a value that is proportional to a number of digital photographs that are indexed by both the first user identifier and the second user identifier.

19. The system of claim 16, the operations further comprising, for each first face template that matches a second face template for a second user identifier:

generating a quality score for the first face template;

determining whether the quality score exceeds a quality score threshold; and if the quality score exceeds the quality score threshold, storing in the digital photograph index data indexing the first photograph by second user identifier, and that specifies that area in the digital photograph in which the face of the second user identified by second user identifier is located.

* * * * *